US012435301B1

(12) United States Patent
Lagerstedt

(10) Patent No.: US 12,435,301 B1
(45) Date of Patent: Oct. 7, 2025

(54) PACK FOR POTENTIALLY HARMFUL SUBSTANCES REMOVAL AND METHOD OF USE

(71) Applicant: Alkaa Industries, LLC, Monroe, NY (US)

(72) Inventor: Paul Abraham Lagerstedt, Monroe, NY (US)

(73) Assignee: Alkaa Industries, LLC, Monroe, NY (US)

( * ) Notice: Subject to any disclaimer, the term of this patent is extended or adjusted under 35 U.S.C. 154(b) by 349 days.

(21) Appl. No.: 18/165,155

(22) Filed: Feb. 6, 2023

(51) Int. Cl.
*C12H 1/04* (2006.01)
*B01D 15/36* (2006.01)

(52) U.S. Cl.
CPC ......... *C12H 1/0432* (2013.01); *B01D 15/362* (2013.01); *B01D 15/363* (2013.01); *B01D 2257/30* (2013.01)

(58) Field of Classification Search
CPC ... C12H 1/00; C12H 1/02; C12H 1/04; C12H 1/0432; B01J 47/012; B01J 47/018; B01J 47/019
See application file for complete search history.

(56) References Cited

U.S. PATENT DOCUMENTS

| | | | |
|---|---|---|---|
| 6,821,427 B2 * | 11/2004 | Macpherson | C02F 1/56 210/730 |
| 9,670,442 B2 * | 6/2017 | Meadows | C12H 1/0432 |
| 10,611,989 B2 | 4/2020 | Meadows et al. | |
| 2003/0153457 A1 * | 8/2003 | Nemoto | B01J 20/3236 96/108 |
| 2011/0309294 A1 * | 12/2011 | Nichols | C08L 5/08 252/182.12 |

OTHER PUBLICATIONS

Amazon.com: PureWine Wand Technology Histamine and Sulfite Filter, Purifier Alleviates Wine Allergies & Headaches, Stir Stick Aerates Wine—Pack of 8 : Clothing, Shoes & Jewelry, https://www.amazon.com/PureWine-Headaches-Removes-Sulfites-Histamines/dp/B06XGP85LR/ref=sr_1_5?crid=1PANV2T1KLSAN&keywords=alcohol%2Bwand&qid=1647472132&sprefix=alcohol%2Bwand%2Caps%2C200&sr=8-5&th=1 (product first available Feb. 13, 2017).
http://web.archive.org/web/20220927113840/https://en.wikipedia.org/wiki/Chitosan, cached on Sep. 27, 2022.
(Continued)

*Primary Examiner* — Ryan B Huang
(74) *Attorney, Agent, or Firm* — Leonid Kisselev

(57) ABSTRACT

A variety of potentially harmful substances can be removed from alcoholic and non-alcoholic beverages as well as condiments using a pack that includes a variety of ingredients within a liquid-permeable housing. The pack is immersed in a liquid that needs to be detoxified, with the ingredients binding to the potentially harmful compounds within the liquid, and after a desired period of time, the pack is separated from the liquid, thus removing from the potentially harmful compounds that are bound to the ingredients from the liquid. When combined within a single compartment of the housing, the ingredients display synergy in removing of many of the potentially harmful compounds. However, separation of the ingredients within different compartments of the pack allows to increase removal of tannins from the liquid while still maintaining a high level of removal of other potentially harmful substances.

20 Claims, 10 Drawing Sheets

(56) References Cited

OTHER PUBLICATIONS http://web.archive.org/web/20221217142208/https://en.wikipedia.org/wiki/Zeolite, cached on Dec. 17, 2022.
http://web.archive.org/web/20220811221908/https://en.wikipedia.org/wiki/Clinoptilolite, cached on Aug. 11, 2022.
http://web.archive.org/web/20221231190631/https://en.wikipedia.org/wiki/Activated_carbon, cached on Dec. 31, 2022.
Poureini, Fatemeh, and Maryam Nikzad. "Application of Chitosan for wastewater treatment." 2nd International conference on sustainable development, strategies and challenges with a focus on Agriculture, Natural Resources, Environment and Tourism. Tabriz, Iran, Feb. 23-25, 2016.
Amazon.com: Wine Sulfite Filter to Remove Sulfite and Histamine, Eliminate Headaches, Reduce Wine Allergies(12 Pack): Home & Kitchen, https://www.amazon.com/Sulfite-Histamine-Eliminate-Headaches-Allergies/dp/B08NPFC315/ref=sr_1_2?crid=26ROSFNYG2ZSO&keywords=V7T7V7&qid=1675789141&sprefix=v7t7v7%2Caps%2C116&sr=8-2&th=1 (product first available Oct. 2, 2019).
Amazon.com: V7T7V7 Wine Sulfite Filter to Remove And Histamine, Eliminate Headaches, Reduce Allergies: Home & Kitchen, https://www.amazon.com/V7T7V7-Histamine-Eliminate-Headaches-Allergies/dp/B0B2JWZ8RZ/ref=sr_1_4?crid=26ROSFNYG2ZSO&keywords=V7T7V7&qid=1675789604&sprefix=v717v7%2Caps%2C116&sr=8-4&th=1 (product first available May 27, 2022).
Amazon.com: Wine Sulfite Filter to Remove Sulfite And Histamine, Eliminate Headaches, Reduce Wine Allergies(8 Pack): Home & Kitchen, https://www.amazon.com/Sulfite-Histamine-Eliminate-Headaches-Allergies/dp/B092TBDSKS?ref_=ast_sto_dp&th=1 (product first available Apr. 18, 2021).
Amazon.com | Ullo Wine Purifier with 4 Selective Sulfite Filters. Remove Sulfites and Histamines, Restore Taste, Aerate, and Experience the Magic of Ullo Pure Wine.: Bar Tools & Drinkware, https://www.amazon.com/%C3%9Cllo-Purifier-Selective-Sulfite-Capture/dp/B01JO9PLR4/ref=sr_1_1?keywords=ullo+wine+filter&qid=1675792210&sprefix=Ullo+%2Caps%2C179&sr=8-1&ufe=app_do%3Aamzn1.fos.006c50ae-5d4c-4777-9bc0-4513d670b6bc (product first available Aug. 4, 2016).
Amazon.com | Ullo Full Bottle Replacement Filters (25pack) With Selective Sulfite Technology to Make Any Wine Histamine and Sulfite Preservative Free: Bar Tools & Drinkware, https://www.amazon.com/Replacement-Filters-Selective-Technology-Preservative/dp/B08KYDFT8G/ref=psdc_13162311_t2_B01JO9PLR4 (product first available Oct. 9, 2020).
http://web.archive.org/web/20230128054649/https://en.wikipedia.org/wiki/Ion-exchange_resin, cached on Jan. 28, 2023.
Kraljević Pavelić, S., Simović Medica, J., Gumbarević, D., Filošević, A., Pržulj, N., & Pavelić, K. Critical review on zeolite clinoptilolite safety and medical applications in vivo. Frontiers in pharmacology, 9, 1350. (2018).
Amaral, L., Silva, D., Couto, M., Nunes, C., Rocha, S. M., Coimbra, M. A., . . . & Moreira, A. Safety of chitosan processed wine in shrimp allergic patients. Annals of Allergy, Asthma & Immunology, 116(5), 462-463. (2016).
Büyükyörük, Sadik. "Chitosan for Using Food Protection." Chitin and Chitosan-Physicochemical Properties and Industrial Applications. IntechOpen, 2021.
United States Department of Agriculture, National List Petition, by Z. Wilkinson of Tidal Vision, Jun. 26, 2020.

\* cited by examiner

| Test length | Sulfites (ppm) | | | Histamines (ppb) | | | Tyramine (ppb) | | | Tannins (ppm) | | | Phenylethylamine (ppb) | | | Congeners - Acetaldehyde (ppm) | | |
|---|---|---|---|---|---|---|---|---|---|---|---|---|---|---|---|---|---|---|
| | Before Level | After 5 minutes | % Reduced | Before Level | After 5 minute exposure | % Reduced | Before Level | After 5 minute exposure | % Reduced | Before Level | After 5 minute exposure | % Reduced | Before Level | After 5 minute exposure | % Reduced | Before Level | After 5 minute exposure | % Reduced |
| 5 minute test (all ingredients together) | 30 | 20 | -33.33% | 268.66 | 160.16 | -40.39% | 320 | 143.19 | -55.25% | 133.23 | 62.38 | -53.18% | 21.21 | 14.31 | -32.53% | 23.39 | 18.2 | -22.19% |
| | Before Level | After 10 minutes | % Reduced | Before Level | After 10 minute exposure | % Reduced | Before Level | After 10 minute exposure | % Reduced | Before Level | After 10 minute exposure | % Reduced | Before Level | After 10 minute exposure | % Reduced | Before Level | After 10 minute exposure | % Reduced |
| 10 minute test (all ingredients together) | 30 | 16 | -46.67% | 268.66 | 118.93 | -55.73% | 320 | 91.01 | -71.56% | 133.23 | 44.32 | -66.73% | 21.21 | 9.93 | -53.18% | 23.39 | 16.17 | -30.87% |

Fig. 6.
30

| Ingredients in pack | Sulfites (ppm) | | | Histamines (ppb) | | | Tyramine (ppb) | | | Tannins (ppm) | | | Phenylethylamine (ppb) | | | Congeners - Acetaldehyde (ppm) | | |
|---|---|---|---|---|---|---|---|---|---|---|---|---|---|---|---|---|---|---|
| | Before Level | After 5 minute exposure | % Reduced | Before Level | After 5 minute exposure | % Reduced | Before Level | After 5 minute exposure | % Reduced | Before Level | After 5 minute exposure | % Reduced | Before Level | After 5 minute exposur | % Reduced | Before Level | After 5 minute exposur | % Reduced |
| 1.0 gram cation exchange resin | 30 | 25 | -16.67% | 268.66 | 252.06 | -6.18% | 320 | 267.28 | -16.48% | 133.23 | 131.51 | -1.29% | 21.21 | 18.04 | -14.95% | 23.39 | 23.36 | -0.13% |
| 1.0 gram anion exchange resin | 30 | 30 | 0.00% | 268.66 | 250.45 | -6.78% | 320 | 314.13 | -1.83% | 133.23 | 91.62 | -31.23% | 21.21 | 20.9 | -1.46% | 23.39 | 20.73 | -11.37% |
| 0.5 grams zeolite | 30 | 30 | 0.00% | 268.66 | 268.34 | -0.12% | 320 | 318.96 | -0.33% | 133.23 | 132.95 | -0.21% | 21.21 | 21.15 | -0.28% | 23.39 | 23.39 | -0.00% |
| 0.5 grams chitosan | 30 | 27 | -10.00% | 268.66 | 251.04 | -6.56% | 320 | 319.25 | -0.23% | 133.23 | 91.04 | -31.67% | 21.21 | 21.12 | -0.42% | 23.39 | 22.52 | -3.72% |
| 0.5 grams activated charcoal | 30 | 27 | -10.00% | 268.66 | 268.3 | -0.13% | 320 | 300.73 | -6.02% | 133.23 | 124.34 | -6.67% | 21.21 | 18.62 | -12.21% | 23.39 | 23.19 | -0.86% |

| | Sulfites (ppm) | | | Histamines | | | Tyramine (ppb) | | | Tannins | | | Phenylethylamine (ppb) | | | Congeners - Acetaldehyde | | |
|---|---|---|---|---|---|---|---|---|---|---|---|---|---|---|---|---|---|---|
| | Before Level | After 5 minute exposure | % Reduced | Before Level | After 5 minute exposure | % Reduced | Before Level | After 5 minute exposure | % Reduced | Before Level | After 5 minute exposure | % Reduced | Before Level | After 5 minute exposure | % Reduced | Before Level | After 5 minute exposure | % Reduced |
| All ingredients in one compartment | 30 | 21 | -30.00% | 44.9128 | 35.8946 | -20.13% | 91.79 | 64.4337 | -29.80% | 88.39746 | 61.56653 | -30.35% | 1.8635 | 1.3606 | -26.99% | 0.42668 | 0.28296 | -33.68% |
| All ingredients in separate compartments | 30 | 24 | -20.00% | 44.9428 | 37.4342 | -16.71% | 91.79 | 69.4028 | -24.39% | 88.39746 | 54.52062 | -38.32% | 1.8635 | 1.494 | -19.83% | 0.42668 | 0.402801 | -5.60% |

| Product being tested | Sulfites (ppm) | | | Histamines (ppb) | | | Tyramine (ppb) | | | Tannins (ppm) | | | Phenylethylamine (ppb) | | | Congeners - Acetaldehyde (ppm) | | |
|---|---|---|---|---|---|---|---|---|---|---|---|---|---|---|---|---|---|---|
| | Before Level | After 5 minute exposure | % Reduced | Before Level | After 5 minute exposure | % Reduced | Before Level | After 5 minute exposure | % Reduced | Before Level | After 5 minute exposure | % Reduced | Before Level | After 5 minute exposure | % Reduced | Before Level | After 5 minute exposure | % Reduced |
| Barefoot Cabernet Savignon (186ml) | 18 | 12 | -33.33% | 124.0322 | 85.4978 | -31.07% | 5.41 | 3.7773 | -30.14% | 578.34468 | 485.02872 | -16.14% | 3.0003 | 1.8672 | -37.77% | .205353 | 0.155133 | -24.66% |
| Heineken Lager (12 ounces) | 10 | 8 | -20.00% | 26.1018 | 23.3277 | -10.63% | 113.09 | 89.7012 | -20.68% | None detected | None Detected | None Detected | .4316 | .3824 | -11.40% | 1.988832 | 1.76091 | -11.44% |
| Smirnoff Brand standard vodka (60ml) | 0 | 0 | None detected | None detected | None detected | None detected | None detected | None detected | None Detected | None detected | None Detected | None Detected | None detected | None detected | None detected | 0.567134 | 0.49444 | -12.82% |
| Jack Daniels Whiskey (60ml) | 0 | 0 | None detected | None detected | None detected | None detected | None detected | None detected | None Detected | 84.3357 | 78.24462 | -7.22% | None detected | None detected | None detected | 0.567134 | 0.49444 | -12.82% |

| Product being tested | Sulfites (ppm) | | | Histamines (ppb) | | | Tyramine (ppb) | | | Tannins (ppm) | | | Phenylethylamine (ppb) | | | Congeners - Acetaldehyde (ppm) | | |
|---|---|---|---|---|---|---|---|---|---|---|---|---|---|---|---|---|---|---|
| | Before Level | After 5 minute exposure | % Reduced | Before Level | After 5 minute exposure | % Reduced | Before Level | After 5 minute exposure | % Reduced | Before Level | After 5 minute exposure | % Reduced | Before Level | After 5 minute exposure | % Reduced | Before Level | After 5 minute exposure | % Reduced |
| Angry Orchard Cider (6 ounces) | 2 | 1 | -50.00% | None Detected | None Detected | None detected | None detected | None Detected | None detected | None Detected | None Detected | None Detected | None detected | None detected | None detected | 1.47486 | 1.14956 | -22.06% |
| Earl Grey (1 tea bag steeped in 6 oz of water for 5 minutes) | Not tested | Not tested | Not tested | Not tested | Not tested | Not tested | Not tested | Not tested | Not tested | 604.86 | 463.25244 | -23.41% | Not tested | Not tested | Not tested | Not Tested | Not Tested | Not tested |
| Soy Sauce (1 ounce) | Not tested | Not tested | Not tested | Not tested | Not tested | Not tested | 164.25 | 158.3309 | -3.61% | Not tested | Not tested | Not tested | Not tested | Not tested | Not tested | Not Tested | Not Tested | Not tested |
| Worcestershire Sauce (1 ounce) | Not tested | Not tested | Not tested | Not tested | Not tested | Not tested | 164.25 | 158.3309 | -3.61% | Not tested | Not tested | Not tested | Not tested | Not tested | Not tested | Not Tested | Not Tested | Not tested |

Fig. 9.
70

| Test length | Sulfites (ppm) | | | Histamines (ppb) | | | Tyramine (ppb) | | | Tannins (ppm) | | | Phenylethylamine (ppb) | | | Congeners – Acetaldehyde (ppm) | | |
|---|---|---|---|---|---|---|---|---|---|---|---|---|---|---|---|---|---|---|
| | Before Level | After 10 minutes | % Reduced | Before Level | After 10 minute exposure | % Reduced | Before Level | After 10 minute exposure | % Reduced | Before Level | After 10 minute exposure | % Reduced | Before Level | After 10 minute exposure | % Reduced | Before Level | After 10 minute exposure | % Reduced |
| 10 minute test (all ingredients together) | 30 | 16 | -46.67% | 30.3308 | 11.7616 | -61.22% | 61.29 | 34.1453 | -44.29% | 80.87091 | 37.2462 | -53.94% | 5.58 | 2.9 | -48.03% | 3.02286 | 2.4683 | -18.35% |
| | Before Level | After 15 minutes | % Reduced | Before Level | After 15 minute exposure | % Reduced | Before Level | After 15 minute exposure | % Reduced | Before Level | After 15 minute exposure | % Reduced | Before Level | After 15 minute exposure | % Reduced | Before Level | After 15 minute exposure | % Reduced |
| 15 minute test (all ingredients together) | 30 | 16 | -46.67% | 30.3308 | 11.7421 | -61.29% | 61.29 | 26 | -57.58% | 80.87091 | 26.5513 | -67.17% | 5.58 | 1.71 | -69.35% | 3.02286 | 2.2663 | -25.03% |

PACK FOR POTENTIALLY HARMFUL SUBSTANCES REMOVAL AND METHOD OF USE

FIELD

This application relates in general to liquid detoxification, and in particular to a pack for potentially harmful substances removal and method of use.

BACKGROUND

While water is essential for human survival and good health, many other water-based liquids, while enjoyable, may have negative effects on human health. For example, while a multitude of people enjoy alcoholic beverages, the consumption of such beverages can lead to many long-term and short-term health consequences. While alcohol users are often aware of the role of ethanol in causing such consequences, the role of other chemicals in the alcoholic beverages is less well-known. For instance, beverages such as wine often include sulfites and histamines, whose effects can vary from headaches to skin rashes to even asthma-like symptoms; tyramine, which can trigger headaches and cause a spike in blood pressure; tannins, which while having some reported health benefits, can also contribute to headaches; phenylethylamine, which can initiate migraine-type headaches; and congeners such as acetaldehyde, which is an irritant to mucous membranes, can cause nausea, vomiting, and headaches, and is a known carcinogen. Other alcoholic beverages often include similar compounds. Such substances are also present in many non-alcoholic products. For example, black teas have levels of tannins sufficient to trigger headaches in sensitive individuals while soy sauce and Worcester sauce have significant levels of tyramine.

The susceptibility of an individual to many effects of these substances varies significantly from person to person, and while some are able to enjoy water-based beverages and condiments in moderation without immediate ill-effects, sensitive individuals tend to experience severe consequences, such as debilitating headaches, upon consuming beverages or condiments with sufficient levels of such potentially harmful substances. The plight of such sensitive individuals is further exacerbated by the fact that the levels of the potentially harmful substances can vary significantly between different brands of the same product (such as different brands of beer), but also between different batches of the same product (such as different batches of the same wine). Thus, even if a sensitive individual is able to enjoy a particular beverage or condiment once without notable consequences, there is no guaranty that the same kind of beverage will not cause a debilitating migraine when consumed the second time. As a result, such sensitive individuals are severely limited in their options of consumptions of beverages, condiments, and other water-based products due to the danger of encountering compounds that will trigger debilitating consequences.

While attempts have been made to create a way to purify beverages from potentially harmful substances prior to consumption, the results of these attempts have proved insufficient. For example, U.S. Pat. No. 9,670,442, issued Jun. 4, 2017, to Purewine Inc., discloses a container that holds an ion exchange matrix including a mixture of cation exchange beads and anion exchange beads, with the cation exchange beads including a cationic mineral form and the anion exchange beads including a chloride mineral form. The matrix captures cationic and anionic components in the beverage that have a noxious effect on human health and that reach the matrix through a screen included as part of the container. The container can be a tea bag. While the described container aims to remove noxious substances such as sulfites, histamines, tyramine, tannins or similar compounds, the exclusive use of the exchange matrix for the removal of the substances limits the kinds and amounts of substances that can be removed from the beverage to those that are capable of engaging in ion-exchange with the matrix while that matrix has not yet been saturated. As only a single mechanism of action is available, the described container may not be sufficiently potent in detoxifying a beverage to a safe degree when the types and amounts of potentially harmful substances exceeds the ability of that mechanism to handle.

Other products on the market that attempt to remove some of the potentially harmful substances from beverages can end up increasing the levels of other potentially harmful substances. For example, China Ion Resin Tea Bag distributed by V7T7V7 of China and Üllo Wine Purifier Wand distributed by Üllo® of Chicago, Illinois, based on Applicant's experimental data, increase the levels of histamines and acetaldehyde in white wine while also lowering the levels of other potentially harmful substances. While this result may be acceptable for individuals with very specific sensitivities, for individuals with a broad sensitivity profile, an adverse reaction to a beverage treated with such products is still likely.

Accordingly, there is a need for a way to safely remove a broad range of potentially-harmful substances from water-based products meant for human consumption.

SUMMARY

A variety of potentially harmful substances can be removed from alcoholic and non-alcoholic beverages as well as condiments using a pack that includes a variety of ingredients within a liquid-permeable housing. The pack is immersed in the liquid that needs to be detoxified, with the ingredients binding to the potentially harmful compounds within the liquid, and after a desired period of time, the pack is separated from the liquid, thus removing the potentially harmful compounds that are bound to the ingredients from the liquid. When combined within a single compartment of the housing, the ingredients display synergy in removing many of the potentially harmful compounds. However, separation of the ingredients within different compartments of the pack allows to increase removal of tannins from the liquid while still maintaining a high level of removal of other potentially harmful substances.

In one embodiment, a pack for liquid detoxification is provided. The pack includes a housing permeable to a liquid when immersed in that liquid, wherein a plurality of potentially harmful substances are present in the liquid; and a plurality of ingredients within the housing, wherein each of the ingredients interacts with one or more of the potentially harmful substances when exposed to those substances in the liquid, the plurality of ingredients including a cation exchange resin, an anion exchange resin, and a sorbent, wherein the sorbent promotes at least one of the other ingredients remaining within the housing when the housing is immersed in the liquid and wherein a removal of the housing from the liquid removes from the liquid at least some of the potentially harmful substances with which at least one of the ingredients that remains within the housing interacts.

In a further embodiment, a pack for dissolved tannins removal is provided. The pack includes a housing including a plurality of separated compartments, wherein all of the compartments are permeable to a liquid when the housing is immersed in that liquid and wherein a plurality of potentially harmful substances that include one or more tannins are dissolved in the liquid; and a plurality of ingredients within the housing, wherein each of the ingredients interacts with one or more of the potentially harmful substances when exposed to those substances in the liquid, the plurality of ingredients including an anion exchange resin and chitosan that interact with one or more of the tannins, the anion exchange resin and the chitosan located in different compartments of the housing, wherein a removal of the housing from the liquid removes from the liquid at least some of the potentially harmful substances with which at least one of the ingredients that remains within the housing interacts.

In a still further embodiment, a pack for potentially harmful substance removal is provided. The pack includes a housing permeable to a water-based product when immersed in that product, wherein a plurality of potentially harmful substances are present in the product; and a plurality of ingredients within the housing, wherein at least some of the ingredients interact with one or more of the potentially harmful substances when exposed to those substances in the water-based product, the plurality of ingredients including a cation exchange resin, an anion exchange resin, chitosan, activated charcoal, and natural volcanic rock, wherein a removal of the housing from the product removes from the product at least some of the potentially harmful substances with which at least one of the ingredients that remains within the housing interacts.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

BRIEF DESCRIPTION OF THE DRAWINGS

FIG. 5 is a table showing results of a test of removal of potentially harmful substances from 186 ml of white wine using a pack with the following ingredients: 1.0 gram of cation exchange resin, 1.0 gram of the anion exchange resin, 0.5 grams of chitosan, 0.5 grams of zeolite, 0.5 grams of activated carbon.

FIG. 6 is a table showing results of a test of removal of potentially harmful substances from 186 ml of white wine using packs that each include one of the following ingredients: 1.0 gram of cation exchange resin 14, 1.0 gram of the anion exchange resin 15, 0.5 grams of chitosan 16, .0.5 grams of zeolite 17, 0.5 grams of activated carbon 18.

FIG. 7 is a table 40 showing results of a test of removal of potentially harmful substances from 186 ml of white wine using a pack 10 in accordance with the embodiment of FIG. 1 with all of the ingredients 12 in a single compartment and a pack in accordance with the embodiment of FIG. 2 with all of the ingredients separated into different compartments.

FIG. 8 is a table 50 showing the results of applying the pack to a variety of alcoholic and non-alcoholic beverages in accordance with one embodiment, including Smirnoff s® Brand standard vodka, Heineken® Lager, Angry Orchard® cider, Jack Daniel's® Whiskey, and Barefoot® Cabernet Savignon red wine.

FIG. 9 is a table showing results of a test of removal of potentially harmful substances from 186 ml of white wine using two packs 10 that were immersed in the white wine for 10 minutes and 15 minutes respectively, each pack with the following ingredients within a single compartment: 1.0 gram of cation exchange resin, 1.0 gram of the anion exchange resin, 0.5 grams of chitosan, .0.5 grams of zeolite, and 0.5 grams of activated carbon.

DETAILED DESCRIPTION

Figure 1:
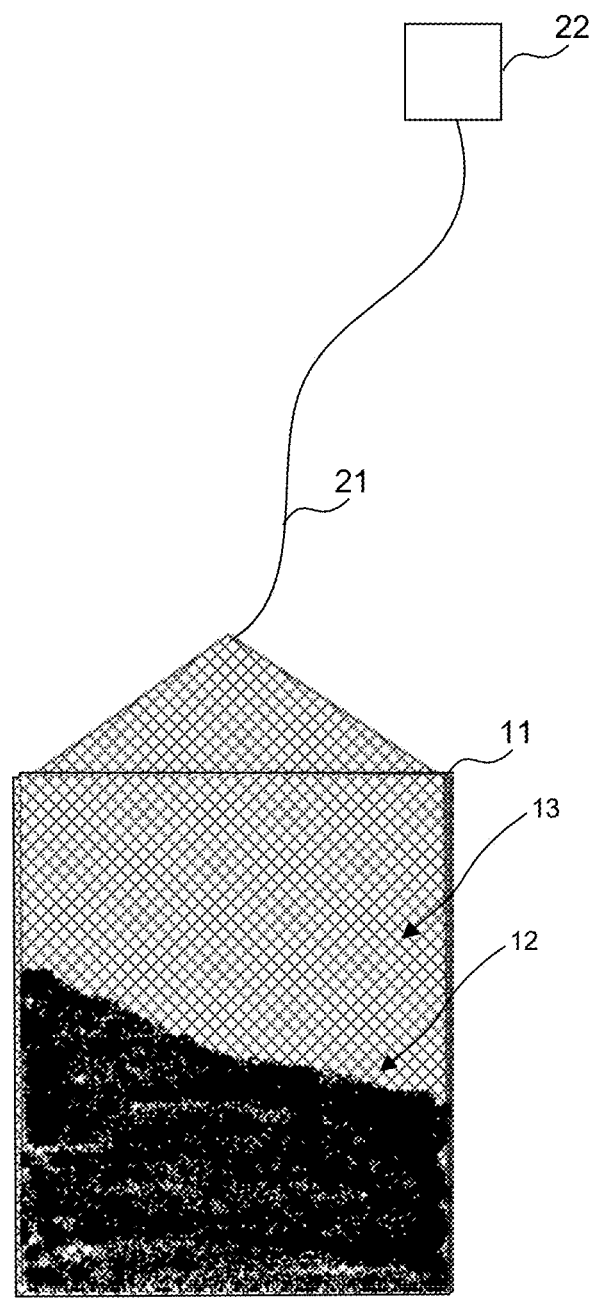
FIG. 1 is a diagram showing a pack for potentially harmful substance removal in accordance with one embodiment.

Ability to detoxify water-based products, such as alcoholic and non-alcoholic beverages as well as liquid condiments, can be enhanced through a combination of a multifaceted ingredients that can be combined for synergistically removing a greatest amount of diverse potentially harmful compounds or kept separately when a focus on removal of one particular potentially harmful compound is desired. FIG. 1 is a diagram showing a pack 10 for potentially harmful substance removal in accordance with one embodiment. The pack 10 includes a liquid-permeable housing 11 within which the ingredients 11 for removal of potentially harmful compounds from a water-based product are located. The housing 11 can be porous, with the size of the pores being small enough to keep the majority of the ingredients 12 within the housing 11 yet large enough to allow the liquid to pass in and out of the housing 11. The housing 11 can be made out of filter paper, food-grade plastics, silk cotton, silk, though other materials are also possible. In one embodiment, a tea bag (without the tea) can serve as a housing 11, though in a further embodiment, other kinds of housing 11 are possible. As shown with reference to FIG. 1, the housing 11 forms a compartment 13 within which the ingredients are stored together for maximum synergy. However, as described further below with reference to FIG. 2, the ingredients 12 can be separated into multiple compartments 13 to maximize the removal of one kind of the potentially harmful compounds such as tannins. Further, while the housing 11 is shown as conical, other shapes of the housing 11 are also possible.

The housing 11 can be optionally coupled to an appendage 21, such as a string, though other kinds of appendages are also possible. The appendage 21 can be used to move the pack 10 while the pack 10 is immersed in the water-based product. The end of the appendage opposite to the end coupled to the housing 11 can in turn be coupled to an additional the object 22, such as a piece of paper or plastic, that simplifies pulling on the appendage 21. In a further embodiment, the pack 10 can be without any appendages 21 (and consequently without the object 22).

Figure 2:
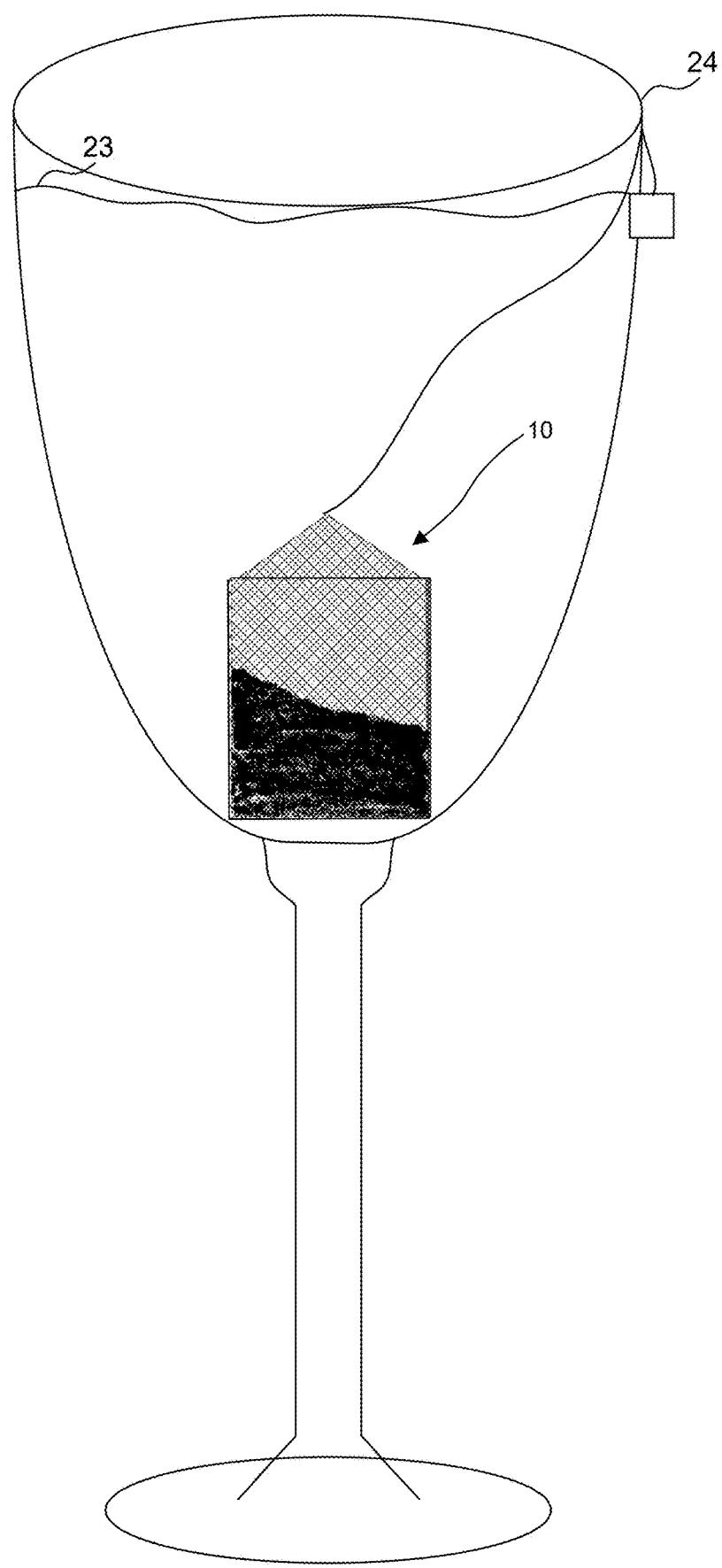
FIG. 2 is a diagram showing a pack of FIG. 1 within a vessel with a water-based product in accordance with one embodiment.

As further described below, the pack 10 acts through being immersed into a vessel with a water-based product (such as a beverage or a condiment), kept in the vessel for a period corresponding to the desired degree of purification (such as between of five and fifteen minutes), and separated from the product upon the expiration of the period, such as through the pack 10 being removed from the vessel or the product being removed from the vessel. The separation of the pack 10 from the product removes from the potentially-harmful substances that became bound to the ingredients within the pack 10. FIG. 2 is a diagram showing a pack 10 of FIG. 1 within a vessel 24 with a water-based product 23 in accordance with one embodiment. While the vessel 24 is shown as a wine glass, other kinds of vessels are also possible. Further, while the product 23 being detoxified can be wine, other kinds of the water-based products 23 that can be detoxified (have levels of potentially harmful substances decreased) are possible. In this description, the term water-based product 23 means a liquid that includes water, which includes a solution that includes water, a suspension that includes water, and a colloid that includes water. Thus, a water-based product 23 can include alcoholic beverages, including white and red wine, beer, and spirits such as vodka and whiskey (though application of the pack 10 to other alcoholic beverages are possible); non-alcoholic beverages, such as tea (though application of the pack 10 to other non-alcoholic beverages is also possible); and liquid condiments, such as soy sauce and Worcester sauce (though application of the pack 10 to other condiments is also possible). Other water-based products are possible. However, in a further embodiment, all variations of the pack 10 could be used for detoxification of products that do not include water in any significant quantity, such as a purely ethanol-based beverages.

The ingredients 12 include a plurality of substances that can remove potentially-harmful compounds from products 23 that need to be detoxified. One of the ingredients 12 can be a cation exchange resin 14 (shown with reference to FIG. 3) that can remove positively-charged ions from the liquid the housing 11 is immersed in. The resin 14 can be in the form of beads, though other shapes of the resin 15 are also possible In one embodiment, the cation exchange resin 14 can include one or more of PC002 sold by Pure Resin™ Co., Ltd. of Zhejiang, China; Pure Resin™ PC002BK sold by Pure Resin™ Co., Ltd. of Zhejiang, China; Amberlite® IR120 NA resin sold by ROHM and HAAS™ Company of Philadelphia, Pennsylvania; C-20 resin sold by ROHM and HAAS™ Company of Philadelphia, Pennsylvania; Dowex HCR-S(E)S F/F resin manufactured by The Dow™ Chemical Company of Midland, Michigan; Purolite® C100E resin sold by Purolite®, an Ecolab Company, of King of Prussia, Pennsylvania; CGS or CGS-BL resins distributed by Resintech® Inc. of Camden, New Jersey; S100LF resin sold by Bayer® AG of Leverkusen, Germany; C-8 SF Na resin sold by United States Resin Company™ of Phoenix, Arizona; Levatit® S-100 G1 resin sold by Lanxess® AG of Cologne, Germany; SK-106 and CFX5 resins distributed by Mitsubishi® Chemical Corporation of Tokyo, Japan; KS-660 ion exchange resin distributed by Varion™, Thermax Tulsion® T-40 softening cation exchange resin distributed by Thermax Ltd of Pune India; BR Resin 001X7 resin produced by ComCess™ of Anyang city, China; Prosoft™ Gold resin distributed by Safe Water Technologies™, Inc. of Elgin, Illinois, though other kinds of resin 14 are possible.

A further ingredient 12 can be an anion exchange resin 15 (shown with reference to FIG. 3) that can remove negatively-charged ions from the liquid the housing 11 is immersed in. The resin 15 can be in the form of beads, though other shapes of the resin 15 are also possible. Such anion exchange resin can include PA104 sold by Pure Resin™ Co., Ltd. of Zhejiang, China; A104 resin sold by ROHM and HAAS™ Company of Philadelphia, Pennsylvania; SAR resin distributed by The Dow™ Chemical Company of Midland, Michigan; SGB2 resin distributed by Resintech® Inc. of Camden, New Jersey; DIAION SA20AP resin distributed by Mitsubishi® Chemical Corporation of Tokyo, Japan; M610 resin sold by Bayer® AG of Leverkusen, Germany; Purolite® A300E resin sold by Purolite®, an Ecolab Company, of King of Prussia, Pennsylvania; ASB-2/A550 and M-600/610 resins sold by Lanxess® Sybron Chemicals Inc of Birmingham, NJ; A-S2 CL resin sold by United States Resin Company™ of Phoenix, Arizona; Tulsion® A-32 resin sold distributed by Thermax Ltd of Pune India; USF Brand Resin A-244 Type II Anion in Cl Form distributed by Serv-A-Pure™ Company of Bay City, MI; VP OC 1960 and Monoplus Sr 7 resins sold by Lanxess® AG of Cologne, Germany; and Indion® NSSR resin distributed by Ion Exchange (India) Limited of Mumbai, India, though other kinds of anion exchange resins are also possible.

Figure 3:
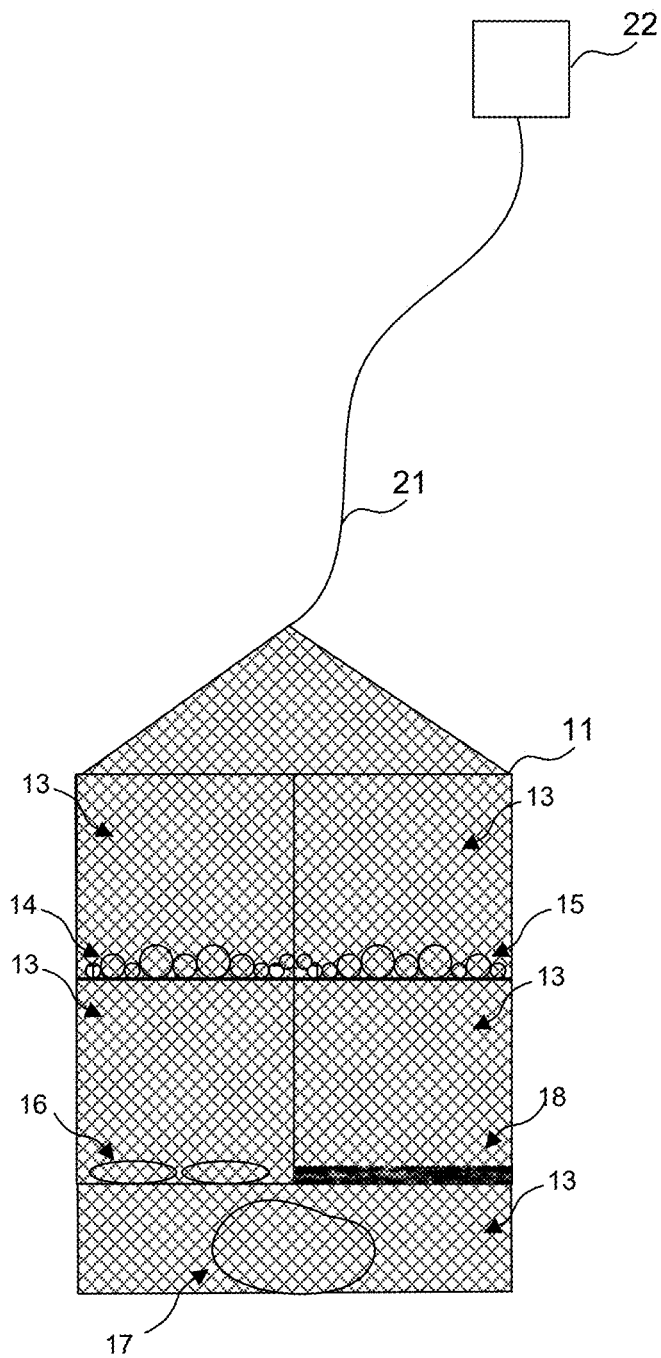
FIG. 3 is a diagram showing a pack for potentially harmful substance removal in accordance with a further embodiment.

A still further ingredient 12 can be a sorbent, such as chitosan 16 (shown with reference to FIG. 3). Chitosan is a second most abundant biopolymer after cellulose, being produced by deacetylation of chitin, and is a copolymer of glucosamine and N-acetylglucosamine. Chitosan is non-toxic, biodegradable, and has hydroxyl and amine groups that make chitosan an effective adsorbent. In one embodiment, the chitosan 16 can be one or more of: D-DF-85-751449 chitosan flake produced by D-DF-85-751449 C chitosan flake distributed by Chitolytic™ of Toronto, Ontario, Canada; Chitosan Flake CAS #90-12-76-4 sold by Dungeness Environmental Solutions™, Inc. of Everett, WA; Chitosan Flake Food Grade 618-480-0 sold by Mark Nature online store; Chitosan Flake Food Grade SSA1P1 sold by Chitosanlab™ of Brech, France; Chitosan Flake Food Grade NAT-0097 sold by Matexcel™ of Shirley, NY; 100G Chitosan flake produced by Tidal Vision® Inc. of Bellingham, WA; H20 Treatment Chitosan Flake, Water Grade distributed by Qingdao Develop Chemistry Co. LTD™ of Qingdao, Shandong, China; H20 Treatment Chitosan Flake, Water Grade distributed by Shaanxi Rainwood Biotechnology Co., LTD™ of Xi'an, Shaanxi, China; and H20 Treatment Chitosan Flake, Water Grade distributed by Blueweight Biotech LLP™ of Andra Pradesh, India, though other kinds of chitosan are also possible.

A still further ingredient 12 can be natural volcanic rock 17 (showing with reference to FIG. 3), such as clinoptilolite or another zeolite. Zeolites are microporous, crystalline aluminosilicate materials commonly that have adsorbent and catalytic properties. In one embodiment, the natural volcanic rock 17 can be one or more of Zeolite Clinoptiliolite H20 filtration granules sold by Ida-Ore Zeolite, LLC™ of Kimberly, Idaho; Zeaqua™ zeolite clinoptiliolite granules distributed by Zeocem™, a.s. of Bystre, Slovakia; H20 filtration zeolite clinoptiliolite distributed by Xiamen Zeolitemin Biotech Co., Ltd™ of Fujian, China; Zeolite Clinoptiliolite granules sold by KMI Zeolite Inc.™ of Pahrump, Nevada; 9003 May 8 zeolite clinoptiliolite granules sold by Hebei Tianhuibao Co., Ltd™ of Shikan Industrial Zone, Lingshou County, Hebei Province, China; YL-004 zeolite clinoptiliolite granules sold by Gongyi Yalv Material Co., Limited™ of Henan, China; Zeo-Lj21 zeolite clinoptiliolite granules sold by Hebei Aotesi New Material Technology Co., Ltd™ of Dongzhuang Industrial Zone, Yanchuan Town, Lingshou, Hebei Province China; PXJC zeolite clinoptiliolite granules sold by Shijiazhuang Puxi Building Materials Technology Co., Ltd.™ of China; Mq_ZC zeolite clinoptiliolite granules sold by Gongyi City meiqi Industry & Trade Co., Ltd™ of Gongyi City, Henan Province, China; 005-FS, 1-2 mm zeolite clinoptiliolite granules sold by Hebei Hengguang Minerals CO. Ltd™ of Ling Shou county, China; 215-283-8 zeolite clinoptiliolite granules sold by Zhengzhou Zhulin Activated Carbon Development Co., Ltd.™ of Zhengzhou, Henan, China; NS-Zeolite™ zeolite clinoptiliolite granules sold by SHJIAZHUANG NINGSHU TRADING CO., LTD™ of Shijiazhuang City, China; HJ-F002 zeolite clinoptiliolite granules sold by Anguo Huajie Activated Carbon Manufacturing Co., Ltd.™ of Hebei, China; 9003-05-08 zeolite clinoptiliolite granules sold by Henan Green Food™ of Henan, China; H20 filtration zeolite clinoptiliolite granules sold by Protech Minerals LLC™ of Victorville, CA; AI2034Si02H20 zeolite clinoptiliolite granules sold by Chemicals 101 Corp.™ of Toronto, Canada; 1318-02-01 zeolite clinoptiliolite granules sold by Reade® International Corp. of Riverside, RI; H20 filtration zeolite clinoptiliolite granules sold by AAA All American Filters™ of Pompano Beach, FL; H20 filtration zeolite clinoptiliolite granules sold by Agriculture Green Zeolite Co. LTD™ of Amman, though in a further embodiment, other kinds of volcanic rock 17 are also possible.

A still further ingredient 12 can be activated carbon 18 (shown with reference to FIG. 3), also known as activated charcoal 18, also referred to as activated charcoal 18, a form of carbon that includes low-volume pores that increase the surface area available for adsorption. In one embodiment, the activated carbon can include one or more of 264-846-4 activated carbon sold by Zhengzhou Zhulin Activated Carbon Development Co., Ltd.™ of Zhengzhou, Henan, China; 231-153-3 activated carbon sold by Anguo Huajie Activated Carbon Manufacturing Co., Ltd.™ of Hebei, China; activated carbon sold by HydroTec Systems Company, Inc™ of Tiskilwa, IL; 264-846-4 activated carbon sold by Shenzhen Zhongshan Technology Co., Ltd.™ of Guangdong, China; ASorb 8×30 activated carbon sold by Raj Carbon™ of Tamil Nadu, India; and PSC830 activated carbon sold by Karbonous Inc.™ of City of Industry, CA, though in a further embodiment, other kinds of activated carbon are also possible.

Other kinds of ingredients 12 are also possible.

The diverse ingredients 12 inside the housing 11 provide a way to remove a large quantity of potentially harmful substance from a water-based product. The potentially harmful substances being removed can be sulfites, histamines, tyramine, tannins, phenylethylamine, and congeners such as acetaldehyde, though other potentially harmful substances that can be removed by the pack 10 from a water-based product 23, such as an alcoholic beverage, non-alcoholic beverage, or condiment, are also possible. In one embodiment, the ratio of the ingredients 12 in the housing 11 to each other by weight can be: 1 part of cation exchange resin 14; 1 part of anion exchange resin 15; 0.5 parts of chitosan 16; 0.5 parts of zeolite; and 0.5 parts of activated charcoal 18. Thus, when the pack 11 is used to remove potentially harmful substances from a glass of wine (which is around 150 ml), the pack 10 can include 1.0 gram of cation exchange resin 14, 1.0 gram of the anion exchange resin 15, 0.5 grams of chitosan 16, .0.5 grams of zeolite 17, 0.5 grams of activated carbon 18. As the volume of the water-based product 23 that needs to be detoxified increases, the amount of the ingredient 12 can be scaled up or multiple packs 11 can be used.

The ingredients 12 are synergetic and together provide an overall greater effect on the removal of the potentially harmful substances from the water-based product than the individual components, as can be seen from the empirical results below. FIG. 5 is a table 20 showing results of a test of removal of potentially harmful substances from 186 ml of white wine using two packs 13, each with the following ingredients 12 within a single compartment 13: 1.0 gram of cation exchange resin 14, 1.0 gram of the anion exchange resin 15, 0.5 grams of chitosan 16, .0.5 grams of zeolite 17, 0.5 grams of activated carbon 18. One pack 10 was immersed in 186 ml of Barefoot® Chardonnay white wine for 5 minutes, being moved up and down periodically using an appendage 21, with the pack 10 being removed from the wine after the 5 minutes. A second pack 10 was immersed in 186 ml of Barefoot® Chardonnay white wine for 10 minutes, being moved up and down periodically using an appendage 21, with the pack 10 being removed from the wine after the 10 minutes. As can be seen from the table 20, after 5 minutes, the pack 10 removes a substantial percentage of sulfites, histamines, tyramine, tannins, phenylethylamine, and acetaldehyde, making the wine significantly safer to drink for sensitive individuals. The results achieved using the pack 10 with the above-mentioned ingredients are significantly better than the results achieved using the ingredients individually. FIG. 6 is a table 30 showing results of a test of removal of potentially harmful substances from 186 ml of white wine using packs 10 that each include one of the following ingredients: 1.0 gram of cation exchange resin 14, 1.0 gram of the anion exchange resin 15, 0.5 grams of chitosan 16, .0.5 grams of zeolite 17, 0.5 grams of activated carbon 18. Each of the packs 10 was immersed in 186 ml of Barefoot® Chardonnay white wine for 5 minutes, being moved up and down periodically (using an appendage 21), with the pack 10 being removed from the wine after the 5 minutes. All tests of whose results are shown with in the tables of FIGS. 5 and 6 were done using the same batch of white wine (created by mixing several bottles of the wine together), with each test using fresh wine from that wine (not reusing the same wine for different packs 10).

As can be seen by comparing the 5 minute test duration in table 20 and in table 30, the results of a pack 10 that has all of the ingredients 12 together in one compartment are significantly better for tyramine and histamine removal when compared to combined results for the ingredients 12 in separate packs 10 shown in FIG. 6.

There could be several mechanisms for the demonstrated synergy. One mechanism appears to be that the cation exchange resin 14 and the anion exchange resin 15 are prone to partially disappearing from the housing 11 when the housing 11 is immersed in a water-based product such as white wine, either through dissolution in the wine or through another mechanism. However, when combined with chitosan, the loss of the resins 14, 15 from the housing 11 decreases, possibly due to Chitosan's adsorptive capabilities, thus preserving the amount of the resin 14, 15 that is available to capture the potentially harmful compounds within the wine (or other water-based product) and that can be removed from the wine upon separation of the pack 10 from the wine. Table 1 below illustrates the effect of chitosan 16 on the loss of the resins 14, 15 from the housing 11.

TABLE 1

| Ingredient in housing 11: | Test time | Total Weight of pack 10 before testing: | Total Weight After of pack 10 after being dried after testing | Weight Difference |
|---|---|---|---|---|
| 1.0 gram of cation exchange resin 14 | 5 minutes | 1.29 g | 0.88 g | minus .41 g |
| 1.0 gram of anion exchange resin 15 | 5 minutes | 1.26 g | 0.84 g | minus .42 g |
| 1.0 gram of cation exchange resin 14 and .5 grams of chitosan 16 | 5 minutes | 1.79 g | 1.52 g | minus .27 g |
| 1.0 gram of anion exchange resin 15 and 0.5 grams of chitosan 16 | 5 minutes | 1.83 g | 1.53 g | minus .30 g |

To obtain the data of Table 1, four packs 10 were prepared. One had the cation exchange resin 14 as the only ingredient 12, one had only the anion exchange resin 15 as the only ingredient 12, one had the cation exchange resin 14 and chitosan 16 as the only ingredients 12, and one had the anion exchange resin 15 and the chitosan 16 as the only ingredients. All the packs 10 were weighed, immersed in Barefoot® Cabernet white wine for five minutes, and then dried over a period of forty eight hours before being weighed again. The weight loss of the packs 10 without chitosan 16 was greater than the weight loss of the packs 10 with chitosan 16. Further, visual inspection of the ingredients 12 after the drying has been completed shows that the beads of the resins 14, 15 have decreased in size and that the chitosan 16 was coated with the resins 14, 15, further showing that chitosan 16 helps retain the resins 14, 15 within the housing 11. Separate tests have shown that chitosan 16 does not disappear from the housing 11 when exposed to white wine. Thus, the presence of the chitosan 16 helps preserve the resins 14, 15 (and possibly other ingredients 12) within the housing 11, and thus increases the amount of the potentially harmful compounds that can be removed using the resin 14, 15.

The results seen in FIG. 5 also demonstrates that the increased time of immersion increases the amount of the potentially harmful compounds removed from the wine. The increase is not limited to ten minute of immersion of the pack 10, as can be seen with reference to FIG. 9. FIG. 9 is a table 70 showing results of a test of removal of potentially harmful substances from 186 ml of white wine using two packs 10 that were immersed in white wine for 10 minutes and 15 minutes respectively, each with the following ingredients 12 within a single compartment 13: 1.0 gram of cation exchange resin 14, 1.0 gram of the anion exchange resin 15, 0.5 grams of chitosan 16, .0.5 grams of zeolite 17, 0.5 grams of activated carbon 18. One pack 10 was immersed in 186 ml of Barefoot® Chardonnay white wine for 10 minutes, being moved up and down periodically using an appendage, with the pack 10 being removed from the wine after the 10 minutes. A second pack 10 was immersed in 186 ml of Barefoot® Chardonnay white wine for 15 minutes, being moved up and down periodically using an appendage 21, with the pack 10 being removed from the wine after the 15 minutes. Both tests were done using a single batch of wine (created by mixing together several wine bottles), which was a different batch than the batches used for the tests whose results presented in FIGS. 5, 6, 7, and 8 (with the wine not being reused for tests of different packs 10). As can be seen from the test results, the increased time of immersion of the pack 10 within the wine results in an increased amount of removal of tyramine, tannins, phenylethylamine, and acetaldehyde. Thus, the amount of time that a user immerses the pack 10 in the product 23 that needs to be detoxified can depend on the degree of the detoxification that the individual requires.

While the synergy described above is evident for removing histamines and tyramine when all of the ingredients 12 are within a single compartment 13 of the housing 11, separating the ingredients 12 into different compartments 13 within the housing 11 allows to optimize the removal of tannins from the water-based product while retaining the ability to remove high levels of other potentially harmful substances. FIG. 3 is a diagram showing a pack 10 for potentially harmful substance removal in accordance with a further embodiment. The pack 10 can be used in the same way as the pack 10 of FIG. 1, and can optionally include an appendage 21 and the object 22 to help manipulate the pack 10. In the embodiment shown with reference to FIG. 3, the pack includes a separate compartment 13 for each of the ingredients 12. Each of the compartments 13 are separated from each other by walls that can be structured in the same way as the outer walls of the housing 11; the inter-compartment walls can have the same structure and be made of the same material as the outer walls of the housing 11, being permeable to liquid (such through having pores), yet aiming to prevent the ingredients 12 from leaving their respective compartments 11 (at least by passing through the pores). The compartments 13 can be created by connecting multiple existing packs 10 through heating the outer walls of these packs 10 and joining the heated walls, with each of the initial housings 11 forming a compartment 13 of the final housing 11. Other ways to create the multi-compartment pack 11 are possible. While the separation of the ingredients 12 into separate compartment, as can be seen with reference to FIG. 3, does lessen the removal of most of the potentially harmful substances whose level was tested (though the reduction level still remains significant), the separation also causes an increase in the amount of tannins removed from the wine. FIG. 7 is a table 40 showing results of a test of removal of potentially harmful substances from 186 ml of white wine using a pack 10 in accordance with the embodiment of FIG. 1 with all of the ingredients 12 in a single compartment 13 and a pack 10 in accordance with the embodiment of FIG. 2 with all of the ingredients 12 separated into different compartments 13. Both packs 10 had the same ingredients: 1.0 gram of cation exchange resin 14, 1.0 gram of the anion exchange resin 15, 0.5 grams of chitosan 16, .0.5 grams of zeolite 17, 0.5 grams of activated carbon 18. Both of the packs were immersed within the same amount (186 ml) of Barefoot® cabernet white wine for five minutes, with the packs 10 including strings used to move the packs 10 within the white wine periodically. The ability to increase the removal of the tannins from the beverage being treated allows to the embodiment of the pack 10 of FIG. 2 for detoxification of products that are particularly high in tannins (such as certain red wines and black teas) or for use by individuals who are particularly sensitive to tannins and less sensitive to other potentially harmful compounds. Further, while each of the ingredients 12 is shown as being in a compartment separate to other ingredients with reference to FIG. 3, in a further embodiment, the pack 10 could have multiple compartments 13, with some of the compartments having multiple ingredients 12. All of the tests whose results are presented in FIG. 7 were done using the same batch of white wine (created by mixing together several bottles of the wine), which was a different batch than the batch used for the tests of FIGS. 5 and 6, with the wine not being reused for tests of different packs 10.

While the pack 10 is described above as used for purification of wine, the pack 10 can be similarly used for used for purification of other alcoholic products and non-alcoholic beverages or condiments. FIG. 8 is a table 50 showing the results of applying packs 10 to a variety of alcoholic and non-alcoholic beverages, including Smirnoff's® Brand standard vodka, Heineken® Lager, Angry Orchard® cider, Jack Daniel's® Whiskey, and Barefoot® Cabernet Savignon red wine. All of the packs 10 tested have all the ingredients 12 (1.0 gram of cation exchange resin 14, 1.0 gram of the anion exchange resin 15, 0.5 grams of chitosan 16, .0.5 grams of zeolite 17, 0.5 grams of activated carbon 18.) within the same compartment 13. The packs 10 were immersed in the products 23 for five minutes during the testing. The packs 10 used for the tests of table 50 did not include an appendage 21, though the pack 10 was periodically agitated by swirling when used for the detoxification of the Heineken® Lager. As can be seen from the table 50, while not all of water-based products include the variety of the potentially harmful substances that is present in white wine, the pack 10 can be used to decrease the amounts of the potentially harmful substances that are present in the water-based products 23.

Figure 4:
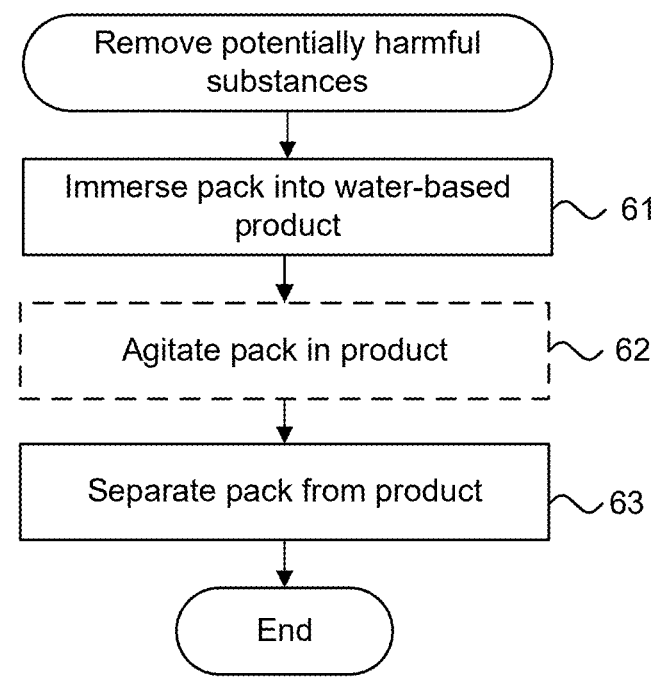
FIG. 4 is a flow diagram showing a method for removing potentially-harmful substances from a water-based product in accordance with one embodiment.

The use of the pack 10 allows to quickly and effectively make water-based products safer for consumption of sensitive individuals. FIG. 4 is a flow diagram showing a method 60 for removing potentially harmful substances from a water-based product in accordance with one embodiment. The method 60 can be performed using the packs 10 of FIGS. 1 and 3. Initially, a pack 10 is immersed into the water-based product 23 that needs to be detoxified (step 61), such by putting the pack 10 into a glass, bottle, or another vessel 24 in which the product 23 is located. The immersion can be for 5 minutes, 10 minutes, 15 minutes, or another time period depending on how much detoxification the consumer of the water-based product is looking for. Optionally, the pack 10 can be periodically agitated while immersed in the product to increase the exposure of the ingredients 12 of the pack 10 (step 61), such by pulling on the appendage 21 attached to the housing 11 if one is present on the housing 11. Alternatively, the pack 10 can be agitated by moving, such as swirling the product 23 within the vessel 24. Other ways to perform the agitation are possible. Upon an expiration of the desired time period, the product is separated from the pack 10 (step 62), ending the method 60. The separation can be accomplished by either removing the pack 10 from the vessel (such as using the appendage 21 or a spoon), or removing the product from the vessel, either by decanting the product into another vessel or drinking of the product.

The levels of the potentially harmful compounds were measured as follows: a) Histamines levels were measured using HPLC-MS/MS; Tyramine levels were measured using HPLC-MS/MS; Sulfites levels were measured using Sulfite Test Kit TK3507-Z; Tannins levels were measured using HPLC-DAD; Phenylethylamine levels were measured using HPLC-DAD Internal method: TM4222 Residual Solvents in Foods by Vanguard Laboratory in Olympia, WA.

While the invention has been particularly shown and described as referenced to the embodiments thereof, those skilled in the art will understand that the foregoing and other changes in form and detail may be made therein without departing from the spirit and scope of the invention.

What is claimed is:

1. A pack for liquid detoxification, comprising:
   a housing permeable to a liquid when immersed in that liquid, wherein a plurality of potentially harmful substances are present in the liquid; and
   a plurality of ingredients within the housing, wherein each of the ingredients interacts with one or more of the potentially harmful substances when exposed to those substances in the liquid, the plurality of ingredients comprising a cation exchange resin, an anion exchange resin, and a sorbent flake within a single compartment of the housing, wherein a weight of the cation exchange resin within the housing is equal to a weight of the anion exchange resin within the housing and a weight of the sorbent flake within the housing is half of the weight of the anion exchange resin within the housing, wherein the sorbent flake interacts with at least one of the other ingredients to retain that at least one other ingredient within the housing when the housing is immersed in the liquid, and wherein a removal of the housing from the liquid removes from the liquid at least some of the potentially harmful substances with which at least one of the ingredients that remains within the housing interacts.

2. A pack according to claim 1, wherein at least some of the cation exchange resin, the anion exchange resin, and the sorbent flake are positioned within a single enclosed space within the housing.

3. A pack according to claim 2, wherein at least some of the cation exchange resin and the anion exchange resin are shaped as beads, wherein a size of at least some of the beads decreases following a period of time within the liquid, and wherein at least one of the anion exchange resin and the cation exchange resin at least partially coats the sorbent flake following the period of time within the liquid.

4. A pack according to claim 1, wherein the ingredients further comprise activated charcoal.

5. A pack according to claim 4, further comprising natural volcanic rock within the housing.

6. A pack according to claim 4, wherein the sorbent flake comprises chitosan.

7. A pack according to claim 1, wherein the liquid comprises one of a solution, a suspension, and a colloid.

8. A pack according to claim 7, wherein the liquid comprises one or more of an alcoholic beverage, a non-alcoholic beverage, and a condiment.

9. A pack according to claim 1, wherein the potentially harmful substances comprise one or more of one or more sulfites, histamine, tyramine, one or more tannins, phenylethylamine, and one or more congeners.

10. A pack for dissolved tannins removal, comprising:
    a housing comprising a plurality of separated compartments, wherein all of the compartments are permeable to a liquid when the housing is immersed in that liquid and wherein a plurality of potentially harmful substances that comprise one or more tannins are dissolved in the liquid; and
    a plurality of ingredients within the housing, wherein each of the ingredients interacts with one or more of the potentially harmful substances when exposed to those substances in the liquid, the plurality of ingredients comprising a cation exchange resin, the plurality of ingredients further comprising an anion exchange resin and chitosan that interact with one or more of the tannins, the anion exchange resin and the chitosan located in different compartments of the housing, wherein a weight of the cation exchange resin within the housing is equal to a weight of the anion exchange resin within the housing and a weight of the chitosan within the housing is half of the weight of the anion exchange resin within the housing, wherein a removal of the housing from the liquid removes from the liquid at least some of the potentially harmful substances with which at least one of the ingredients that remains within the housing interacts.

11. A pack according to claim 10, wherein each of the ingredients is in one of the compartments separate from the compartments in which the remaining ingredients are.

12. A pack according to claim 10, wherein the plurality of ingredients further comprises a cation exchange resin and activated carbon.

13. A pack according to claim 12, further comprising natural volcanic rock within one of the compartments.

14. A pack according to claim 10, wherein the liquid comprises one or more of an alcoholic beverage, a condiment, and a non-alcoholic beverage.

15. A pack according to claim 10, wherein the potentially harmful substances further comprise one or more of one or more sulfites, histamine, tyramine, phenylethylamine, and one or more congeners.

16. A pack for potentially harmful substance removal, consisting of:

a housing permeable to a water-based product when immersed in that product, wherein a plurality of potentially harmful substances are present in the product; and a plurality of ingredients within the housing, wherein at least some of the ingredients interact with one or more of the potentially harmful substances when exposed to those substances in the water-based product, the plurality of ingredients consisting of a cation exchange resin, an anion exchange resin, chitosan, activated charcoal, and natural volcanic rock, wherein a removal of the housing from the product removes from the product at least some of the potentially harmful substances with which at least one of the ingredients that remains within the housing interacts.

17. A pack according to claim 16, wherein all of the ingredients are within a single compartment within the housing.

18. A pack according to claim 16, the housing further consisting of a plurality of compartments that are all permeable to the product and wherein at least some of the ingredients are in a different one of the compartments from the remaining ingredients.

19. A pack according to claim 16, wherein the product comprises one of an alcoholic beverage, a condiment, and a non-alcoholic beverage.

20. A pack according to claim 16, wherein the potentially harmful substances comprise one or more of one or more sulfites, histamine, tyramine, one or more tannins, phenylethylamine, and one or more congeners.

* * * * *